United States Patent [19]

Komerath et al.

[11] Patent Number: 5,794,887
[45] Date of Patent: Aug. 18, 1998

[54] STAGNATION POINT VORTEX CONTROLLER

[76] Inventors: Narayanan M. Komerath, 5390 Bannergate Dr., Alpharetta, Ga. 30202; Leigh Ann Darden, 1150 Collier Rd. NW. Apt. A13, Atlanta, Ga. 30318; John C. Magill, 11 Langmaid Ave. #1, Somerville, Mass. 02145; Kevin G. Peterson, P.O. Box 2612, Kalispell, Mont. 59903

[21] Appl. No.: 559,811

[22] Filed: Nov. 17, 1995

[51] Int. Cl.$^6$ .................................................. B64C 9/00
[52] U.S. Cl. ................. 244/75 R; 244/199; 244/130
[58] Field of Search ................................ 244/213, 199, 244/198, 45 R, 75 R, 130

[56] References Cited

U.S. PATENT DOCUMENTS

| | | | |
|---|---|---|---|
| 2,594,766 | 4/1952 | Goddard | 244/75 R |
| 3,069,112 | 12/1962 | Patterson | 244/75 R |
| 4,015,800 | 4/1977 | Bihrle | 244/76 R |
| 4,176,813 | 12/1979 | Headley et al. | 244/130 |
| 4,225,102 | 9/1980 | Rao | 244/130 |
| 4,399,962 | 8/1983 | Wedertz et al. | 244/3.23 |
| 4,579,298 | 4/1986 | Thomson | 244/3.21 |
| 4,756,492 | 7/1988 | Kranz | 244/3.1 |
| 4,786,009 | 11/1988 | Rao et al. | 244/75 R |
| 4,793,571 | 12/1988 | Kranz | 244/3.1 |
| 4,917,333 | 4/1990 | Murri | 244/75 R |
| 4,925,130 | 5/1990 | Kranz | 244/3.21 |
| 5,050,819 | 9/1991 | Moskovitz | 244/75 R |
| 5,139,215 | 8/1992 | Peckham | 244/3.21 |
| 5,139,216 | 8/1992 | Larkin | 244/3.21 |
| 5,186,117 | 2/1993 | Stallard, III | 244/75 R |
| 5,201,829 | 4/1993 | Peters, Jr. | 244/75 R |
| 5,207,397 | 5/1993 | Ng et al. | 244/45 A |
| 5,273,237 | 12/1993 | Guyton et al. | 244/52 |
| 5,326,050 | 7/1994 | Zell | 244/75 R |
| 5,449,131 | 9/1995 | Kramer | 244/91 |

OTHER PUBLICATIONS

Darden, L.A., Komerath, N.M., "Vortical Flow Control Using a Moveable Stagnation Point", Bulletin of the American Physical Society, vol. 39, No. 9, Nov., 1994.

Darden, L.A., Komerath, N.M., "Forebody Vortex Control at High Incidence Using a Moveable Nose Stagnation Point", AIAA 95-1775, Jun., 1995.

Darden, L.A., Peterson, K.G., Komerath, N.M., "Vortex Control Using a Moveable Nose with Pressure Feedback", AIAA 95-3468, Aug., 1995.

DeBry, B., Komerath, N.M., Liou, S-G., Caplin, J., Lenakos, J., "Measurements of the Unsteady Vortex Flow Over a Wing-Body at Angle of Attack", AIAA 92-2729, Jun., 1992.

Ericsson, L.E., "Sources of High Alpha Vortex Asymmetry at Zero Sideslip", Journal of Aircraft, vol. 29, No. 6, Nov.-Dec., 1992.

*Primary Examiner*—Galen L. Barefoot
*Attorney, Agent, or Firm*—Isaf, Vaughan & Kerr

[57] ABSTRACT

Means are described for controlling the asymmetry of the leeside vortices developing over a pointed object placed at an angle of attack in a flowing fluid. Unlike prior art, the stagnation point controller biases the vortices at their point of origin. Resulting devices enable rapid and precise control of vortex asymmetry. The amplitude and rate of such motion is used to control the amplitude and rate of the asymmetry. Complex types of variations in asymmetry are demonstrated. The stagnation point controller is used in inventing means of controlling the yawing and rolling moments of aircraft and other solid objects at high angle of attack in fluid flow.

1 Claim, 9 Drawing Sheets

STAGNATION POINT VORTEX CONTROLLER

STATEMENT OF RIGHTS

This invention was made with U.S. Government support under Grant No. F49620-93-1-0342, awarded by the Air Force Office of Scientific Research. The United States Government has certain rights in the invention.

BACKGROUND OF THE INVENTION

1. Field of the Invention

This invention relates generally to controlling vortices and more particularly to a method of controlling the relative position and strength of a pair of vortices generated on the leeside of a pointed body. An example of the applications of this invention is in controlling the yawing and rolling motion of aircraft and missiles, or models thereof, at high angles of attack.

2. Prior Art

Aircraft designed for high-speed flight and combat generally have pointed forebodies and swept wings. During maneuvers at subsonic speeds, examples of which include the landing approach, such aircraft fly at high angles of attack with respect to the flight path. When a pointed forebody is placed at an angle of attack generally exceeding 10 degrees in a fluid flow, a pair of vortices forms on its leeside. Each vortex induces a region of low pressure on the adjacent surface, the pressure coefficient being related to the strength of the vortex and its proximity to the surface. Generally, these vortices develop in an asymmetric manner, so that a net side force is induced on the forebody. The product of this side force and the distance to the center of gravity of the aircraft is a yawing moment. An additional and separate effect is that the interaction of the asymmetric vortices with the flow over the wings of the aircraft, causes asymmetry in the lift between the wings of the aircraft. This asymmetry in lift produces a rolling moment on the aircraft. A third effect, related to the first, is that when the aircraft nose is yawed at high angle of attack with respect to the flight direction, the side force on the nose also produces a rolling moment. The present invention deals with a method for controlling the relative position and strength of the vortices, thus inducing and controlling the yawing and rolling moments, precisely and at high rates.

The prior art relative to this invention is comprised of two approaches: the first relative to its principles, and the second relative to its particular embodiment discussed here. Asymmetric vortex flows are encountered in flight at high angles of attack, but generally at low flight velocity, where the forces and moments caused by these vortices are of significant magnitude in relation to the forces and moments produced by other control means. The prior art in controlling vortex asymmetry consists entirely of devices to modify the vortices after they are created. Devices with passive and deployable strakes, non-circular nose cross-sections and thruster jets are different means of achieving such control. The present invention enables the vortices to be controlled by introducing a bias at the very origin of the vortices. This enables rapid and precise control of the resulting effects, with much less power, obtrusion and complexity than the prior art.

The second approach in the prior art is in relation to the particular embodiment of this invention, which is an angularly deflectable nose-tip. When angularly deflectable noses have been used in prior art, the purpose has been to modify pressures downstream of shocks on the body surface in high-speed flight, generally at supersonic or high subsonic speeds. At such speeds, which are comparable in magnitude to the speed of sound, the pressure distribution over the body is dominated by the effects of compressibility in the flow, such as shocks and expansion waves. Flight at such speeds is limited to low angles of attack, where the flow over the forebody does not separate, and thus the formation of forebody vortices generally does not occur. Prior art provides no guidance on the operation of angularly deflectable nosetips under conditions where vortices may form, nor on the expected effects or any means of controlling such effects. The use of such devices in prior art is thus limited to conditions where flow separation does not occur on the forebody. The present embodiment of the present invention enables use of a moveable nosetip device to control vortices at high angles of attack.

U.S. Pat. No. 4,015,800 by Bihrle discloses a device used for aerodynamic spin control. The apparatus deploys a set of doors on the forebody that drastically alter the geometry of the forebody and thus alter the resulting flowfield and its effects in order to recover from catastrophic spin modes.

U.S. Pat. No. 4,176,813 by Headley et al. discloses an aircraft nose and forebody shaped in such a way as to produce vortex patterns that lead to greater static stability on an aircraft.

U.S. Pat. No. 4,225,102 by Rao discloses an apparatus for alleviating side forces on an aircraft at high incidence. The device consists of a symmetrical pair of helical separation trips. This device provides only static control of side forces.

U.S. Pat. No. 4,399,962 by Wedertz et al. discloses an articulated missile nose which uses pyrotechnic means to tilt the nose in supersonic flow, thereby creating asymmetric oblique shocks which result in directional control.

U.S. Pat. No. 4,579,298 by Thomson discloses a spinning missile in which directional control is obtained at high flight speeds by means of an angularly deflectable nose tip which has a rounded apex.

U.S. Pat. No. 4,756,492 by Kranz discloses an aerodynamic means of stabilizing the flight direction of an aerodynamic body at high speeds. The invention uses a mass-balanced, rotatable nosetip, which due to the pressure distribution will always point into the oncoming wind.

U.S. Pat. No. 4,786,009 by Rao discloses an apparatus for controlling the yaw and pitch of aircraft by deflecting a pair of forebody strakes.

U.S. Pat. No. 4,793,571 by Kranz discloses a missile flying at supersonic velocity equipped with a tip which tilts within its housing. The tip is used to create asymmetric shocks, which cause asymmetric forces and moments.

U.S. Pat. No. 4,917,333 by Murri discloses an apparatus constructed of deployable forebody strakes for yaw control.

U.S. Pat. No. 4,925,130 by Kranz discloses an apparatus for changing the flight path of a missile flying at high speeds, comprising a tiltable nose cone means.

U.S. Pat. No. 5,050,819 by Moskovitz discloses a rotatable forebody controller with smoothly varying ellipticity from the forebody apex to the circular base of the controller. The device rotates in the longitudinal plane of the aircraft, its changing geometry affecting the growth of the aircraft boundary layer.

U.S. Pat. No. 5,139,215 by Peckham discloses a guided missile having a nosetip which rotates about the longitudinal axis of the missile. The nosetip is fitted with a pair of strakes whose purpose is to shed forebody vortices.

U.S. Pat. No. 5,139,216 by Larkin discloses a projectile missile comprised of two parts which rotate about the longitudinal axis of the missile. In addition, the nose portion is able to rotate freely relative to the rear portion in order to maintain directional control. This device is used on spinning bodies at high speeds.

U.S. Pat. No. 5,201,829 by Peters discloses a control device for aircraft yaw, comprised of a chine mounted to a support forward of the forebody apex which rotates about the longitudinal axis of the airplane.

U.S. Pat. No. 5,207,397 by Ng et al. discloses an apparatus comprised of a pair of individually actuated forebody strakes.

U.S. Pat. No. 5,273,237 by Guyton et al. discloses a system for aircraft yaw control comprising a set of thrust nozzles. The apparatus provides a jet of gas near the wall of the aircraft forebody.

U.S. Pat. No. 5,326,050 by Zell discloses an aerodynamic surface distention system on an aircraft forebody. The aim of this device is to alter the geometry of the aircraft forebody surface under the vortices after they have been formed and thus alter the resulting moments.

U.S. Pat. No. 5,449,131 by Kramer discloses an actuated forebody with a rotatable strake. The use of the strake provides a means by which a forebody vortex can be shed into the aircraft wake, thus creating moments. Thus it is a method to alter the vortices after they have developed an asymmetry.

The above history demonstrates that none of the prior art envisaged the possibility of controlling forebody vortex asymmetry at its origin, nor of using moveable nosetips to control forebody vortex asymmetry. The prior art in forebody vortex control has sought to modify the vortices after they were formed, either by forcing them to separate from the surface along specified lines, or by preferentially increasing the strength of one or the other by blowing or suction. All of these methods are highly nonlinear, and do not offer continuous, proportional control. In addition, they cannot be actuated in a controlled manner at high rates. The present invention does not use strakes or blowing, but instead introduces a controllable bias into the development of the vortices at the point of origin of the vortices.

The present inventors have described the progress made possible by the present invention. Darden and Komerath (1994) were the first to show a linear causal relationship between vortex asymmetry and motions of the stagnation point in a low-speed flow. Dardenand Komerath (1995) expanded these results and showed that the linear relationship existed over a substantial portion of the forebody, and that the sensitivity of the asymmetry to the motion of the stagnation point increased with the rate of motion of the stagnation point. These results were obtained from experiments where the stagnation point was moved through arbitrary motions under a human operator's control, with no feedback. Darden, Peterson and Komerath (1995) reported extensive measurements of the rolling moments on a winged body at several angles of attack. They demonstrated that the pressure differential between the two sides of the forebody, due to vortex asymmetry, responded rapidly to movements of the stagnation point. They also showed the response of the wing rolling moment to both simple harmonic as well as impulsive movements of the stagnation point. Experiments on a free-to-roll wing-body have also been demonstrated, where the moving stagnation point has been used to control the rolling motion of the wing-body. These experiments have demonstrated use of automated, software-controlled motion of the stagnation point, with and without sensor feedback.

BRIEF DESCRIPTION OF THE DRAWINGS

FIG. 5a shows the stagnation point aligned with the plane of lateral symmetry. FIG. 5b shows the stagnation point deflected from the plane of lateral symmetry. The lower portion of each figure shows a section through plane C—C of the nosetip. This illustrates the streamline directions and boundary layer velocity profiles near the stagnation point.

Figure 1:
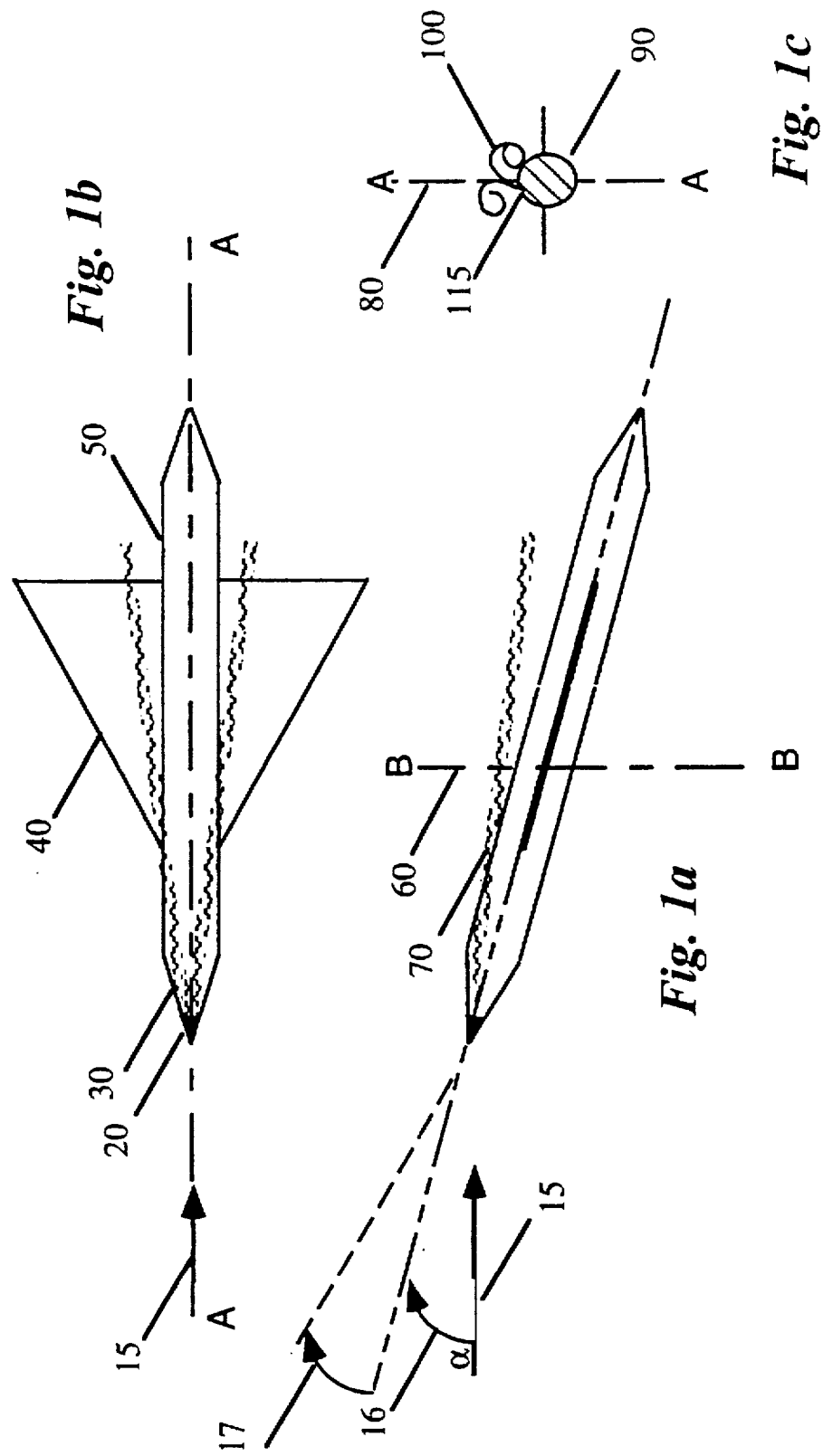
FIGS. 1a through 1c show a top plan view, side elevation and cross-sectional view from the rear of a winged aircraft model with the present invention installed, and with schematic views of asymmetric forebody vortices.

| REFERENCE NUMERALS IN DRAWINGS | |
|---|---|
| 15 | flow direction relative to the aircraft model or other solid body |
| 16 | angle of attack |
| 17 | forebody half-angle |

REFERENCE NUMERALS IN DRAWINGS

| | |
|---|---|
| 20 | nose tip |
| 30 | forebody |
| 40 | lifting surface |
| 50 | fuselage or body of the aircraft model or other solid object |
| 60 | cross-flow plane: B—B |
| 70 | forebody vortex |
| 80 | plane of lateral symmetry: A—A |
| 90 | section of aircraft model or other solid body in cross-flow plane B—B |
| 100 | cross-sectional view of forebody vortex on favored side |
| 110 | zero vorticity contour |
| 115 | zero vorticity point |
| 120 | surface pressure distribution |
| 130 | direction of side force for the vortex asymmetry shown in FIG. 2 |
| 140 | positive direction of wing rollingmoment |
| 150 | rolling moment |
| 160 | stagnation point |
| 170 | surface pressure contours |
| 180 | streamline direction |
| 190 | boundary layer velocity profile in the stagnation point flow on the favored side |
| 200 | boundary layer velocity profile in the stagnation point flow on the adverse side |
| 210 | pivot point |
| 220 | lateral displacement of stagnation point |
| 230 | pivot link |
| 240 | actuator with servo motor |
| 250 | signal connection from controller |
| 260 | controller |
| 270 | inputs to controller |

SUMMARY OF THE INVENTION

Figure 2:
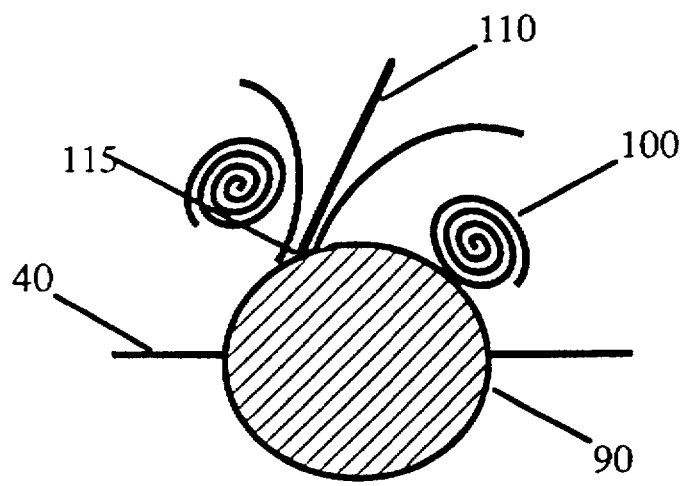
FIG. 2 is an expanded schematic cross-sectional view from the rear of the aircraft model, showing the location of the zero vorticity contour.
Figure 3:
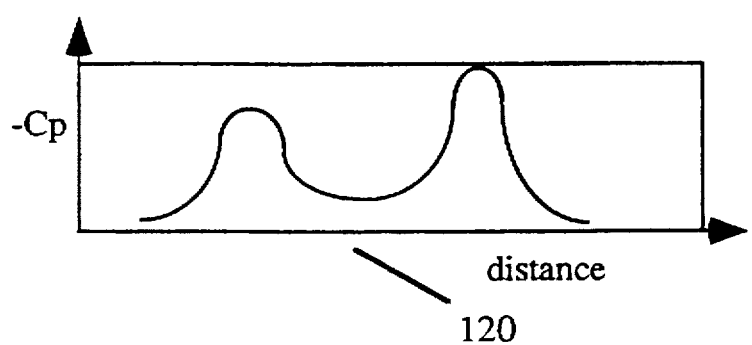
FIG. 3 is a schematic plot of the non-dimensionalized surface pressure coefficient over the surface of the model in the cross-section illustrated in FIG. 2, showing the asymmetry in the suction peaks under the vortices.
Figure 5B:
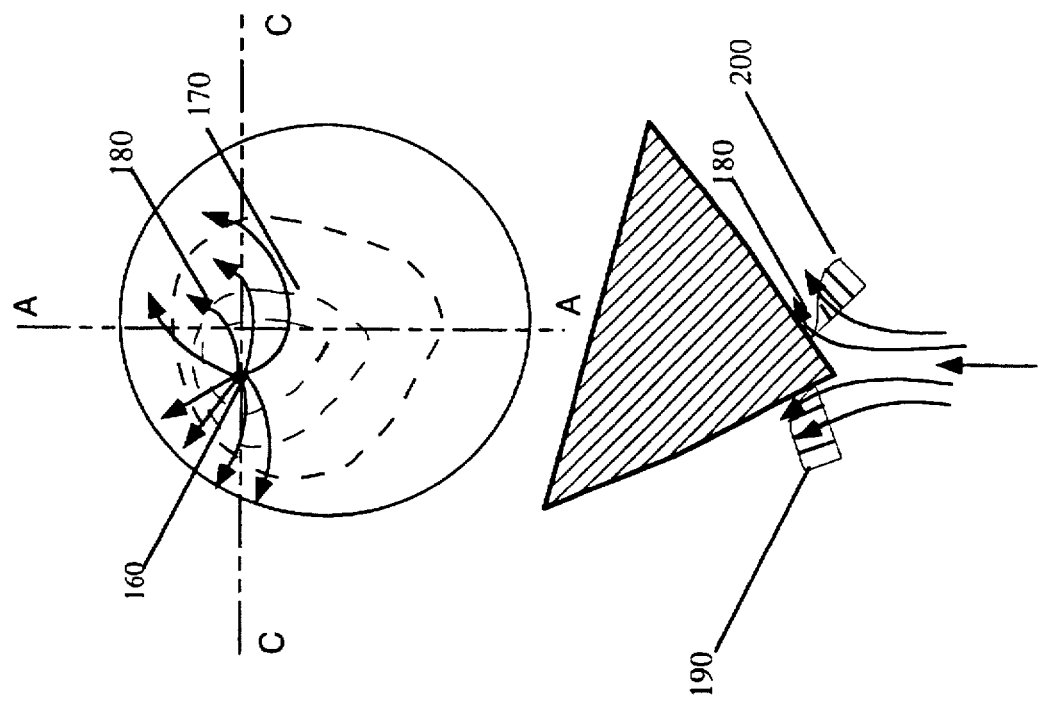
FIGS. 5a and 5b show surface pressure contours and streamline directions around the stagnation point at the tip of the nose, viewed from upstream.
Figure 5A:
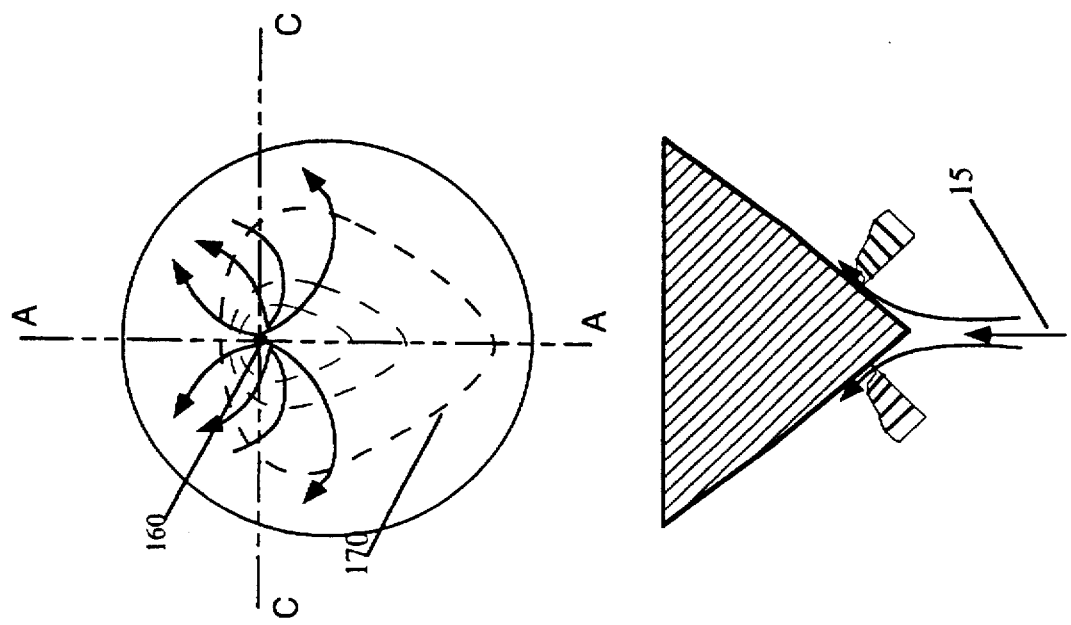

In the following, reference is made to the above drawing figures. When referring herein to a group of related figures (e.g., 5a and 5b), the reference is to the number of the group (e.g., "FIG. 5"). When a slender, pointed solid object 30 is placed at an angle of attack 16 which is generally larger than 10 degrees, in a flowing fluid, a pair of vortices is formed, one along each lateral side of the object. The leeside vortices are formed from the vorticity contained in the boundary layer on the leeside surface. This boundary layer grows as the flow moves downstream, and eventually separates from the surface on either side of the forebody. The separation and thus the formation of vortices occurs when the angle of attack exceeds the forebody half angle 17. The separated shear layers roll up into vortices. Generally, when the angle of attack 16 exceeds twice the value of the half-angle 17, the developed vortices are asymmetric in both position and strength relative to the plane of lateral symmetry 80. The high velocity and low pressure in the central core region of these vortices causes low pressure on solid surfaces adjacent to them, as shown on FIG. 3. The prior art sought to eliminate the asymmetry between the two vortices by forcing the vortices to separate from the surface at the same longitudinal distance from the nose on both sides, or by otherwise influencing the vortices after they had developed. Our invention uses the fact that the boundary layer originates at the stagnation point at the apex of the body, as shown on FIG. 5. We control the asymmetry of the vortices by moving the location of the stagnation point 160 with respect to the plane of lateral symmetry 80, as indicated in FIG. 5, and further clarified in FIG. 6. The left side of FIG. 5 shows the nature of the flow in the vicinity of the stagnation point when the stagnation point 160 is located at the plane of lateral symmetry 80. The flow streamlines around the stagnation point curve equally outwards radially, and the boundary layer near the surface develops equally to both lateral sides. Due to the pressure contours associated with the angle of attack, the streamlines going near the top of the forebody curve down, and those going down curve upwards. Where these streamlines appear to meet, the flow separates from the surface, and the separated shear layer rolls up into a vortex, one on each side of the forebody. When the stagnation point 160 is displaced from the plane of lateral symmetry 80, the stagnation point flow is biased so that on the side towards which the stagnation point is moved, hereinafter called the favored side, the boundary layer develops with a fuller velocity profile 190. The surface pressure decreases sharply along streamlines on this side, as shown by the closer spacing of pressure contours 170 on the favored side. The flow thus maintains a relatively energetic boundary layer on this side and thus separation from the surface is delayed further downstream. On the side of the forebody opposite from the favored side, hereinafter called the adverse side, the stagnation point pressure contours are further apart, indicating that the flow acceleration is less on this side. The streamlines 180 quickly encounter an adverse pressure gradient as they curve over the nose contour, and the boundary layer velocity profile 200 develops an inflection point in the boundary layer profile, leading to early separation from the surface. Due to this early separation, the separated vortex on the adverse side has a lower strength than the vortex on the favored side. As a result, the vortex on the favored side is stronger and lies closer to the surface for a further distance downstream, as seen in FIG. 1 and FIG. 2. This causes the pressure on the favored side to be lower, so that the negative pressure coefficient is higher, than that on the adverse side, as seen in FIG. 3. The forebody thus experiences a net side force 130 directed from the adverse side and towards the favored side. Continuous variation in asymmetry is achieved by continuous motion of the nose stagnation point. Furthermore, rapid variation in the asymmetry is achieved by sudden motion of the stagnation point.

Figure 4:
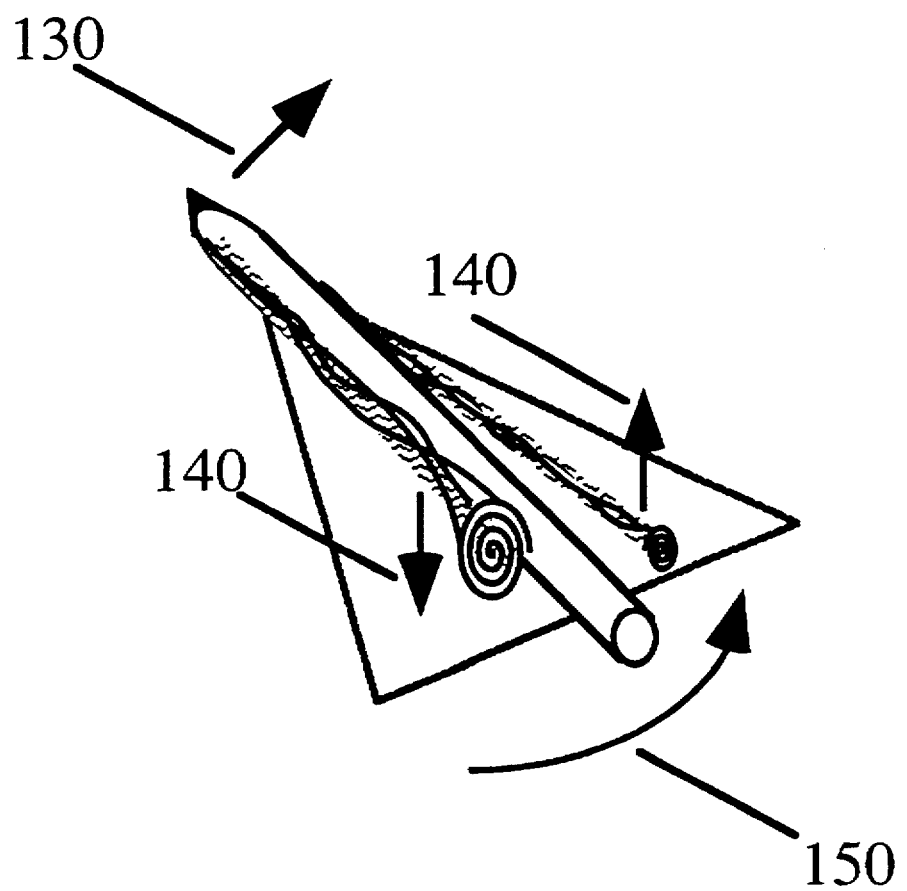
FIG. 4 is a schematic view of a wing-body model, illustrating the directions of the forebody side force and the wing rolling moment consistent with the vortex asymmetry shown in FIGS. 1 and 2.

In another feature of the present invention, the asymmetry in the forebody vortices causes asymmetry in the vortex-dominated flow over wings 40 or other lifting surfaces placed downstream of the forebody. This asymmetric interaction causes the lift forces developed on these surfaces to be asymmetric, as shown in FIG. 4. This force asymmetry causes a rolling moment 150 to be exerted on the object to which these wings or control surfaces are connected. By controlling the location of the stagnation point, the rolling moment 150 can also be altered. We have shown that rapid, sudden or continuous variations in the rolling moment can be caused and controlled by moving the stagnation point.

Figure 6A:
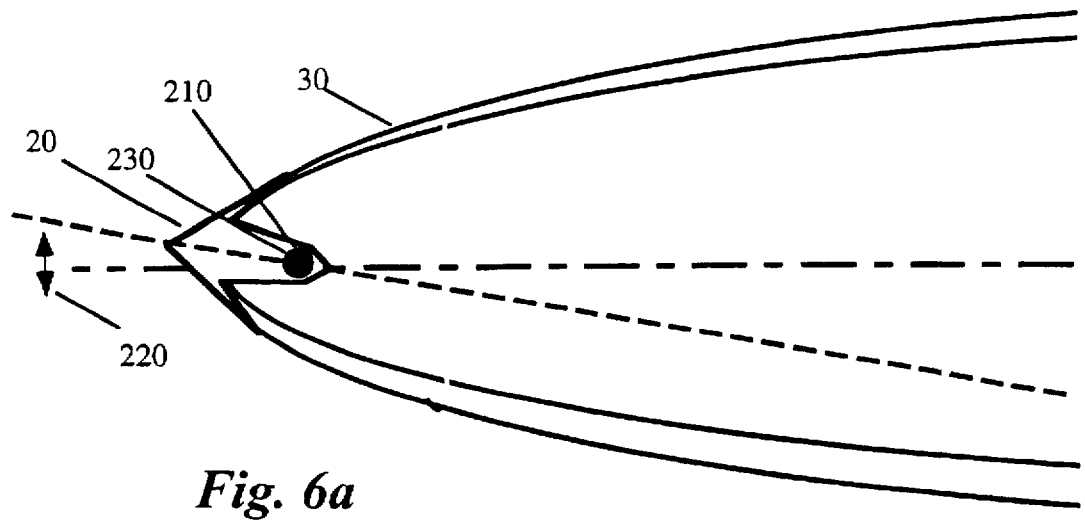
FIGS. 6a and 6b show cut-away views in plan and elevation of an embodiment of the moving stagnation point device, with the stagnation point deflected to the right of the forebody in the yaw plane. The elevational view also shows schematically the provisions for actuating and controlling motions of the nosetip.
Figure 6B:
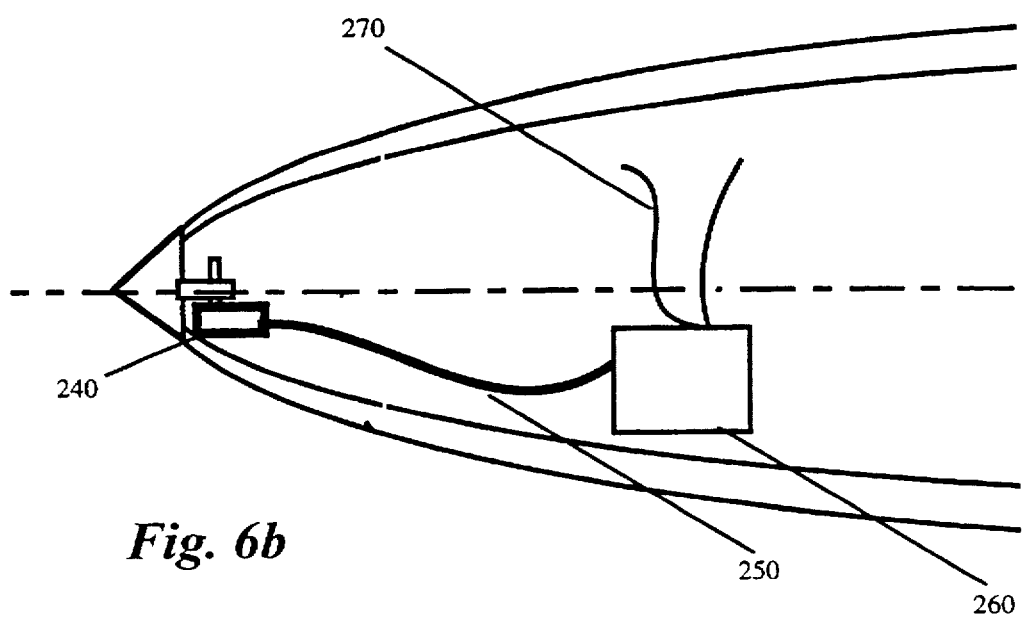

In the present embodiment of the invention, the stagnation point motion comprises a small angular deflection of a conical nosetip 20 in the yaw plane of the aircraft, as shown in FIG. 6. We have shown by means of experimental measurement that the resulting vortex asymmetry is linearly related to the nose motion, with a time delay, so that simple control algorithms can be developed. Relative to the prior art, and also in absolute terms, the device is unobtrusive, and requires little actuation power. Its size and mass are smaller than those of competing technologies, and it can be deployed and controlled more rapidly and more precisely.

The present invention controls the asymmetry in position and strength of vortices by moving the stagnation point which is the origin of the boundary layer which separates from the surface and forms the vortices. By moving the stagnation point, the entire vortex system is biased from its very origin. This obviates the need for control devices such as strakes and jets downstream.

The most obvious objective of controlling vortex asymmetry is to control the side force and yawing moment on aircraft flying at high angles of attack, or aircraft models placed at high angle of attack in wind tunnels. A second objective is to control the rolling moment on aircraft or aircraft models. A third objective, subordinate to the first two, is to perform such control at high rates of change. A fourth objective, subordinate to the third, is to perform such control with arbitrary motion histories. A fifth objective is to perform such vortex control in applications other than those involving aircraft. A sixth objective is to develop a flight control system which enables safe and reliable operation of aircraft during maneuvers at high angles of attack.

Objects and Advantages

This invention enables elimination of the asymmetry which would otherwise develop on most aircraft forebodies at high angles of attack. It also enables the generation of desired amounts of asymmetric force and moments to point the aircraft in a desired direction, during maneuvers at high angles of attack. In addition, it enables the generation of desired amounts of asymmetry in the lift from the wings, in turn generating desired rolling moments.

The advantages of the invention are:

1. it provides vortex control by biasing the stagnation point flow, thereby creating asymmetry which is quite independent of geometric details downstream.
2. it provides a means of vortex control which requires very little power input, but whose effect amplifies downstream.
3. it provides vortex control without the need for pneumatic ducting, slots or a supply of high-pressure gas which would be needed for control means which are based on blowing or suction.
4. it does not require any protrusions from the aerodynamically smooth surface of the aircraft.
5. It does not require modification of the cross-sectional geometry of the nose.
6. It does not require the nose to be rotated through angles greater than 10 degrees.
7. it provides a means of vortex control which is dynamic and capable of operation at high rates.
8. it provides a means of aircraft control which can operate with continuous precision through arbitrary functional forms, not subject to the constraints of devices which are on-off or which can only execute simple harmonic motion.

According to one broad aspect of the invention, and with reference to FIG. 6, there is provided a moveable nosetip means 20 of altering the location of the flow stagnation point. This nosetip is pivoted about an axis, through the pivot point 210, which is oriented such that the nose tip 20 is free to move in the yaw plane of the aircraft. The nose tip is connected to a link 230 which is connected to an actuator 240 driven by a servo motor. The servo motor is actuated by electrical impulses from a controller 260. By actuating the servo motor, the nose tip is deflected in the yaw plane through a small angle, generally less than ten degrees, resulting in a lateral deflection 220 of the stagnation point 160 with respect to the lateral plane of symmetry 80. When the stagnation point is displaced to the right, the boundary layer on the right side stays attached further downstream, while the boundary layer on the left side of the nose separates further upstream. Upon separating from the surface, the vortex on the right side becomes stronger relative to the vortex on the left side, and induces a lower pressure on the right side. A net side force is caused to the right, which results in a yawing moment towards the right. Corresponding effects with opposite sense occur for a leftward movement of the stagnation point.

According to another aspect of the invention, the servo motor in the actuator 240 is actuated rapidly and with rapid changes in direction. The nose tip moves rapidly as well, and the asymmetry of the vortices changes rapidly as well. We have shown by experimental measurement that there is a linear causal relationship between this motion and the resulting degree of asymmetry of the vortices downstream. The degree of asymmetry can be sensed by numerous different ways. One way is to capture images of smoke introduced into the flow and illuminated by a sheet of laser light. This enabled detection of the zero vorticity contour 110, the demarcation line between the two vortices, shown on FIG. 2. The azimuthal location on the aircraft model surface where this zero vorticity contour intersects the body surface in the cross-section of interest is called the zero vorticity point 115, a measure of the asymmetry. The asymmetry can also be sensed by comparing the surface pressure at two points, located one on each side of the plane of lateral symmetry, as shown on FIG. 3.

Figure 9:
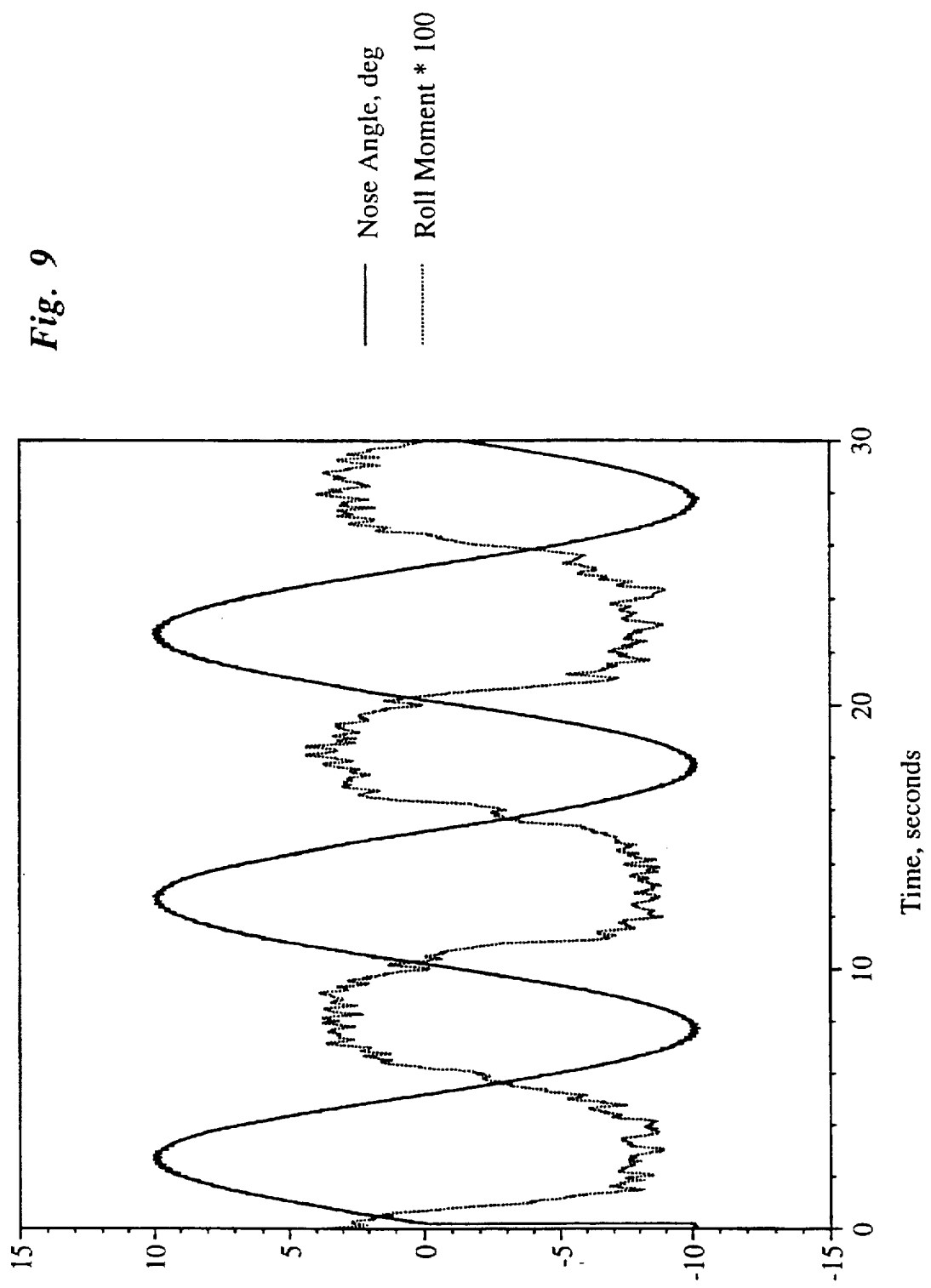
FIG. 9 shows the rolling moment on an aircraft model, and the displacement of the nosetip stagnation point as functions of time, for a smooth variation of the nosetip stagnation point. The angle of attack is 40 degrees, and the flow velocity is 16.7 m/s.
Figure 10:
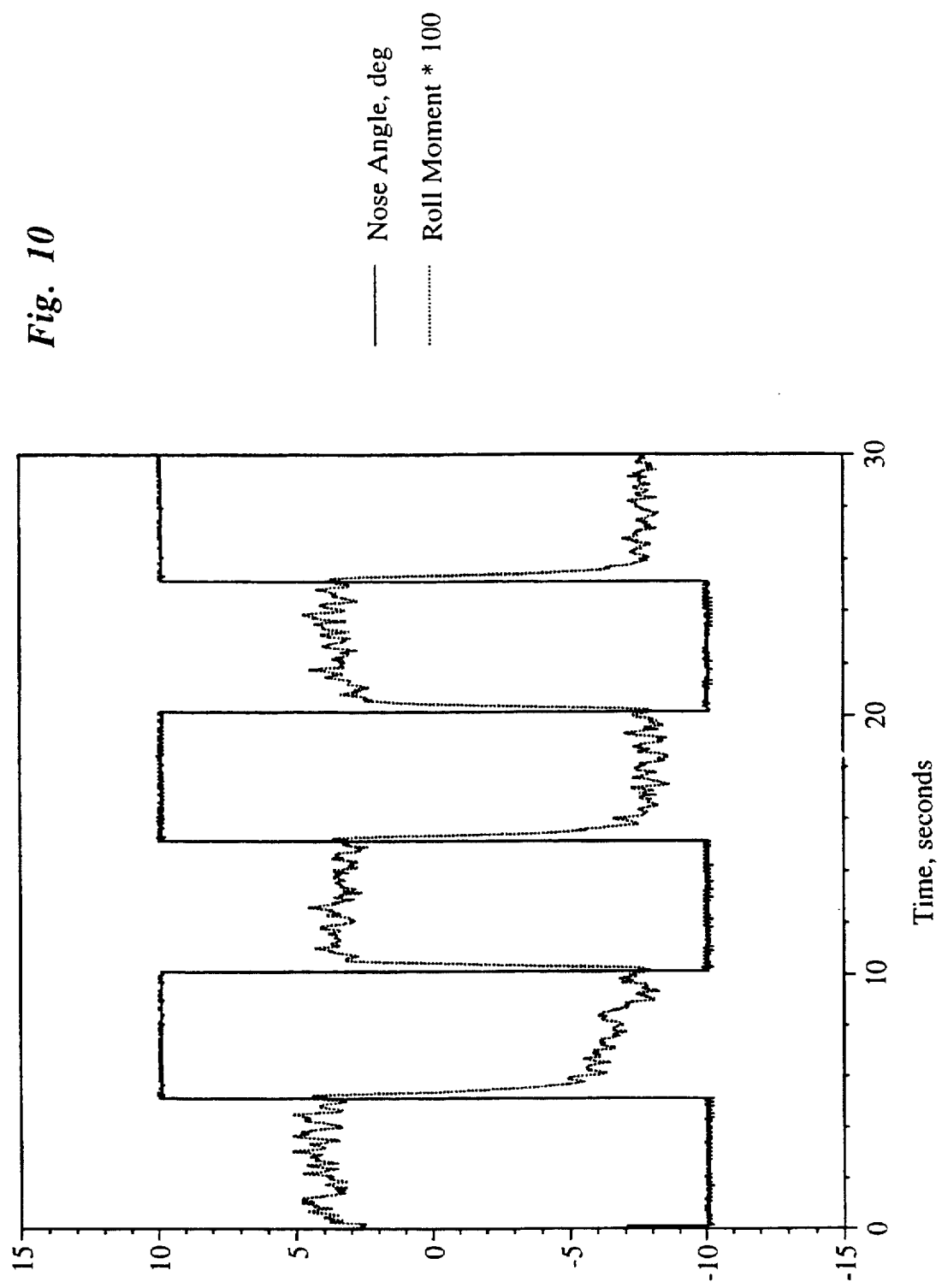
FIG. 10 shows the rolling moment on an aircraft model, and the displacement of the nosetip stagnation point as functions of time, for a square-wave motion of the nosetip stagnation point. The angle of attack is 40 degrees, and the flow velocity is 16.7 m/s.
Figure 11:
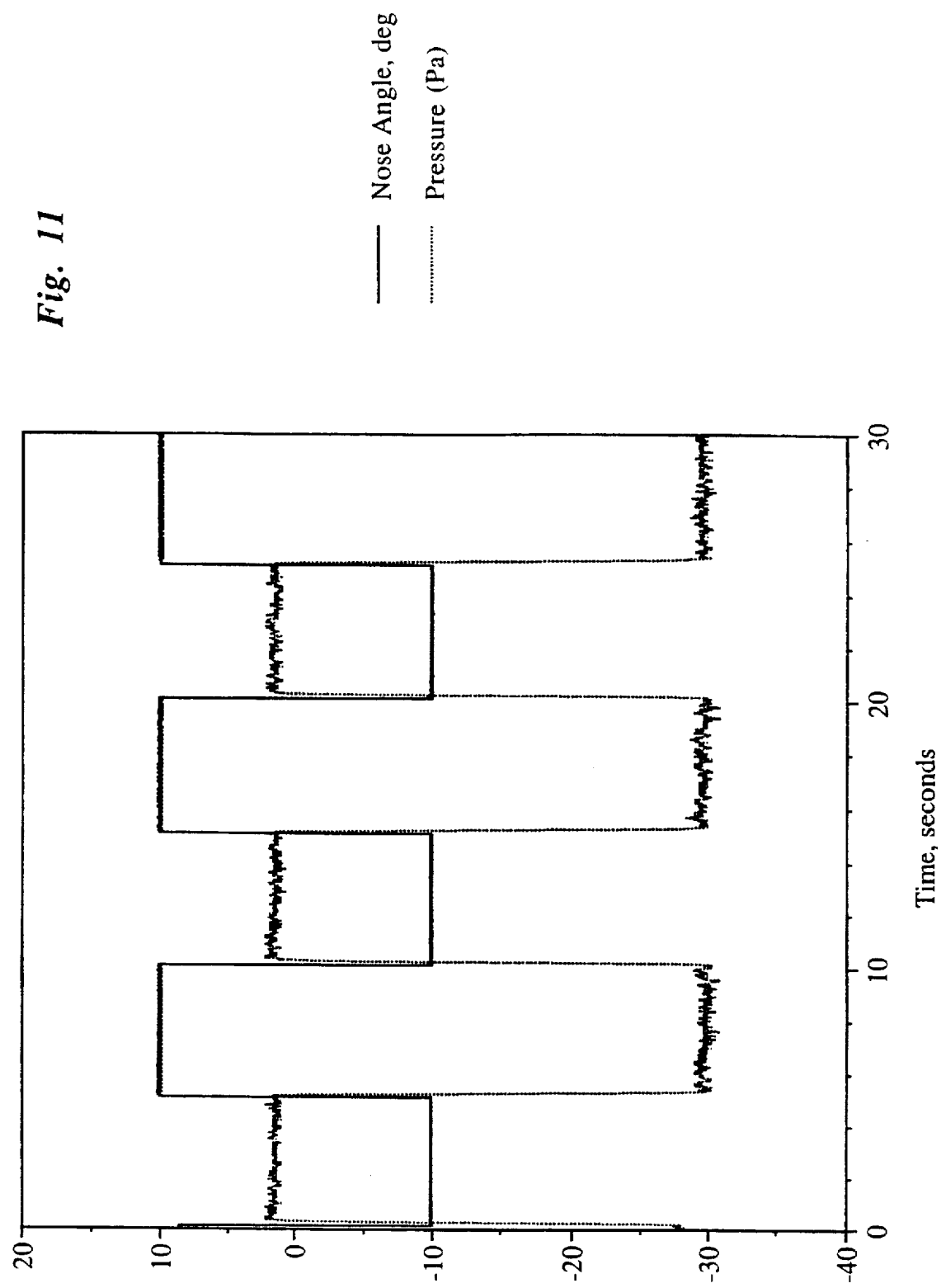
FIG. 11 shows the pressure difference in units of Pascals between the sides of the forebody as a function of time, along with the square-wave, multiple harmonic motion of the stagnation point, in degrees of nosetip deflection, which causes the pressure difference. The angle of attack is 40 degrees, and the flow velocity is 16.7 m/s.

According to yet another aspect of the invention, the vortices from the forebody interact with the flow over the wings, as shown in FIGS. 1 and 2. The lift on the wings is modified as shown on FIG. 4, and the asymmetry in rolling moment can be controlled by moving the nose stagnation point. The rolling moment coefficient based on the wing span is shown in FIG. 9 as a function of nose position. It is seen that rapid, continuous variations in the rolling moment are induced. According to yet another aspect of the invention, the rolling moment can be varied in complex time histories consisting of multiple harmonics, even approximating the extreme case of square-wave motion, by moving the stagnation point in a square-wave motion. This is shown in FIG. 10. According to yet another aspect of the invention, the pressure difference between sensors located on opposite sides of the plane of lateral symmetry 80 on the forebody surface 30, is seen to vary rapidly, and with little change in form, when subjected to sharp and rapid variation of the stagnation point location, as shown in FIG. 11. Again, the pressure history shows the presence of multiple harmonics, closely approximating the extreme case of a square wave.

DESCRIPTION OF THE PREFERRED EMBODIMENT

A typical embodiment of the stagnation point vortex controller is illustrated in FIG. 6. In this illustration, a magnified cut-away view of the forebody 30 is shown. At the very tip of forebody 30 is installed a small nosetip 20. The external shape of the nose-tip shown here is conical, although it can be varied to suit the desired external shape of the aircraft forebody without changing the principles of the invention. Attached to the base of nosetip 20 is an actuator 240. In the embodiment of FIG. 6, actuator 240 takes the form of a circular shaft, although other actuator embodiments are possible.

Located on the actuator shaft 240 a short distance below the base of nosetip 20 is a pivot point 210. Pivot point 210 is positioned along the center axis of forebody 30 and oriented such that the axis of pivot point 210 is perpendicular to the center axis of forebody 30. This allows nosetip 20 to rotate in the yaw plane of forebody 30.

OPERATION OF THE INVENTION

With the forebody placed in a flowing fluid at an angle of attack 16, generally greater than 10 degrees, and particularly greater than the half-angle 17 with respect to the flow direction 15, vortices 70 are generated over the forebody 30.

Generally, the vortices are not symmetric in trajectory or strength with respect to the plane of lateral symmetry 80 of the forebody. The invention operates as described as follows. The stagnation point 160 is displaced in the yaw plane with respect to the plane of lateral symmetry 80. In the embodiment shown in FIG. 6, this deflection is achieved by angularly deflecting the nosetip 20 about the pivot point 210 by means of actuator 240. The actuator 240 in the present embodiment is connected to a lever arm attached to a servo motor, and is activated by rotation of the servo motor. The speed of rotation and the amount of rotation of the servo motor are dictated by an electrical signal from a controller 260. In the present embodiment, the input 270 to the controller 260 is generated by a computer program which calculates the required input signals to execute a specified trajectory of nose tip movement, based on a known prior calibration of the angular position of the stagnation point as a function of the input.

In another obvious variation of the invention, an encoder connected to a position sensor provides feedback of the position of the actuator 240. This feedback signal is received by the controller 260 and conveyed to the computer program in order to re-calculate the required input. In yet another obvious variation, the pressure difference between the two sides of the forebody is sensed by pressure sensors, and is converted to an electrical signal which is used by the computer program as a measure of the asymmetry before re-computing the required input signal to the controller. In yet another obvious variation, the side force or yawing moment on the forebody is sensed and used to recompute the input signal to the controller. In yet another variation, the lift forces or the rolling moment on the wings is sensed and used to recompute said input. In yet another variation, the acceleration of the aircraft or aircraft model about either or both the yaw and roll degrees of freedom is sensed and converted to an electrical signal which is used to recompute said input. In yet another variation, a human or robotic operator determines the desired subsequent development of forces, moments, or vortex locations or strengths, or some combination of the above, or decides to experiment with the subsequent developments, and provides a desired electrical signal which is used to generate said input.

The controller signal indicates the state of the control variable. The control variable could indicate a number of physical parameters such as roll attitude, roll rate, yaw attitude, yaw rate, pressure differential across the two sides of the forebody, roll moment, yaw moment, or other physical parameters. A flight control computer, or the pilot, would provide a control signal for the actuator 240. Then actuator 240 enacts the control signal, rotating nosetip 20 about pivot point 210. Several aspects of the operation of the invention are discussed in the following.

Vortex Asymmetry

FIG. 5 illustrates how a displacement of the stagnation point from the plane of yaw symmetry results in vortices which are asymmetric in strength and location with respect to the lateral plane of symmetry of the aircraft. FIGS. 1 and 4 also illustrate how the interaction of such vortices with the wings of an aircraft produces a rolling moment.

Figure 7:
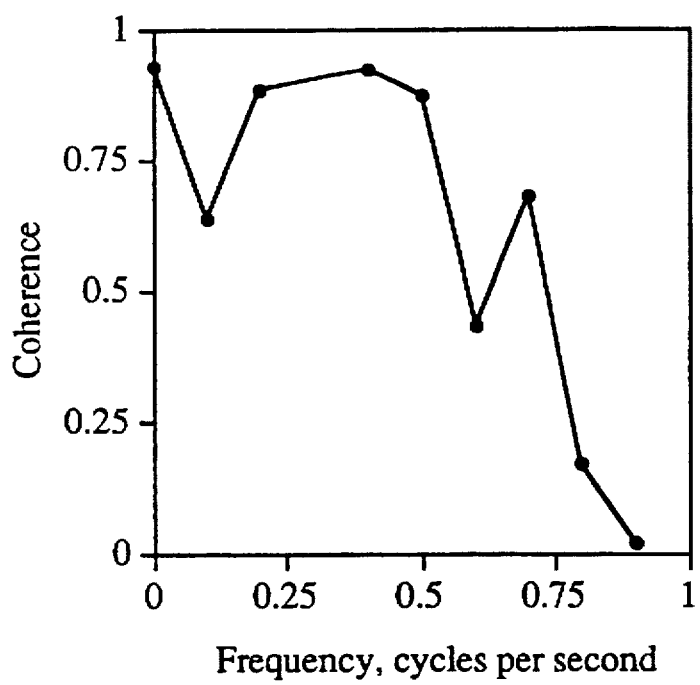
FIG. 7 shows the coherence function between the motion of the nosetip stagnation point and the motion of the zero vorticity point on the body surface at a cross-section located 0.259 meters downstream of the stagnation point.

Linear Causal Relationship Between Stagnation Point Displacement and Vortex Asymmetry The existence of a linear causal effect between stagnation point displacement and vortex asymmetry was proven by Darden et al. (1994) and is detailed in Darden et al (1995). To understand the following discussion, we define the following terms, with reference to the figures. The surface of zero vorticity is that surface which lies between the vortices generated from the two sides of the body, along which surface the velocity vector lies entirely tangential to this surface. It can be taken as the surface dividing the two vortices. The zero vorticity contour 110 is the intersection between the surface of zero vorticity and another plane. If the vortices are symmetric in both positions and strengths with respect to the plane of lateral symmetry 80 of the solid object, then the zero vorticity contour 110 should intersect the cross-sectional plane of the object at the plane of lateral symmetry 80. This intersection point is called the azimuth of symmetry. The azimuth of zero vorticity is the azimuth angle of the point 115 where the zero vorticity contour 110 intersects the surface of the object in the cross-sectional plane B—B, relative to the azimuth of symmetry. The coherence function between two fluctuating quantities is a function of frequency which measures the extent of a linear causal relationship existing between the two functions. FIG. 7 illustrates the coherence function between the fluctuations in the nosetip position and the resulting position of the zero vorticity point 115 in a given plane B—B perpendicular to the direction 15 of the oncoming flow. Coherence values exceeding 0.9 in the range of frequencies of the nosetip movement demonstrate that there is a linear and causal relationship between the nose movement and the asymmetry of the vortices downstream.

Amplification With Increasing Rate Of Deflection

Figure 8:
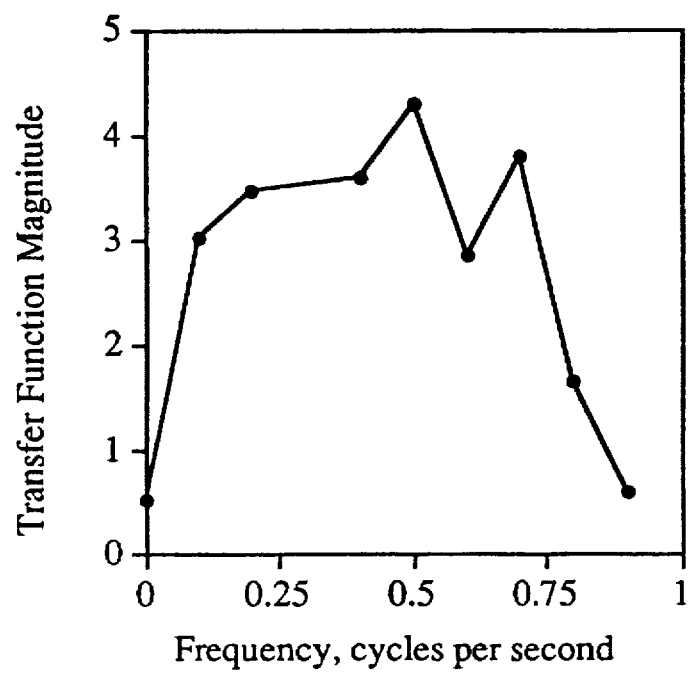
FIG. 8 shows the magnitude of the transfer function between the motion of the nosetip stagnation point and the motion of the zero vorticity point on the body surface at a cross-section located 0.259 meters downstream of the the stagnation point. The angle of attack is 30 degrees and the flow velocity is 2.7 m/s.

FIG. 8 illustrates the magnitude of the response of the degree of vortex asymmetry as a function of the rate of motion of the nose. The increase of the magnitude with increasing frequency shows that higher side forces and hence yawing moments are obtained by moving the stagnation point at higher rates Rapid Development Of Side Force Pressure measurements near the nosetip, detailed in Darden, Peterson and Komerath (1995), and exemplified in FIG. 11, show that the asymmetry in pressure and thus in the yawing moment develops very rapidly after the nosetip is moved, and reproduces the sharp rise times and multiple harmonics of the stagnation point movement.

Wing Rolling Moment

FIG. 9 shows that rolling moment coefficient acting on the aircraft when the nose is deflected, is directly related to the nose movement, but with a time lag.

Complex Waveforms including Multiple Harmonics

FIGS. 10 and 11 show that fluctuations in yawing moment and rolling moment with complex waveforms can be achieved by using some combination of square-wave and multiple-harmonic motion of the stagnation point. While yawing moment is not explicitly shown, the pressure difference between two points on either side of the forebody, shown in FIG. 11, clearly indicates that a corresponding side force and thus a yawing moment must be present.

Although the present invention has been fully described in connection with the preferred embodiment thereof with reference to the accompanying drawings, it is to be noted that various changes and modifications are apparent to those skilled in the art. In particular, it should be noted that there are other methods of displacing the stagnation point from the plane of lateral symmetry without using mechanical or other angular deflection of the nosetip. Similar effects can be achieved by using flexible or actively controllable materials near the stagnation point, or by protruding solid objects through flexible material, or injecting jets of fluids through apertures, at the nosetip. Also, it should be noted that the magnitudes and directions of forces and moments acting on a given solid object for given nosetip deflections may be dependent on the ranges of angle of attack, bank angle, yaw angle and on the particular geometry of the object. Such changes and modifications are to be understood as included within the scope of the present invention as defined by the appended claims, unless they depart therefrom.

What is claimed is:

1. A method of imparting desired attitude control moments to an object moving through a fluid at an angle of attack of at least 10 degrees relative to the direction of motion of the object by controlling the structure of leeside vortices generated by motion of the object through the fluid, said method comprising the step of selectively displacing the stagnation point of fluid flow in the vicinity of the leading end of the object to control the point at which the vortices are generated and thus to control the structure and dynamics of the vortices as they move rearwardly from the stagnation point and over control surfaces of the object;

wherein the step of selectively displacing the stagnation point comprises moving at least a portion of the leading end of the object angularly relative to the direction of motion of the object through the fluid; and wherein the leading end of the object is generally cone shaped and wherein the step of moving at least a portion of the leading end of the object comprises moving the apex of the cone shaped leading end.

* * * * *